United States Patent [19]
Patterson

[11] 4,357,953
[45] Nov. 9, 1982

[54] APPARATUS FOR SLURRYING POWDERED SOLIDS

[75] Inventor: Donald E. Patterson, Ringle Township, Marathon County, Wis.

[73] Assignee: Sterling Drug Inc., New York, N.Y.

[21] Appl. No.: 238,436

[22] Filed: Feb. 26, 1981

[51] Int. Cl.³ .............................................. B01F 3/12
[52] U.S. Cl. .................... 137/88; 137/111; 137/268; 137/624.18
[58] Field of Search ............... 137/268, 624.18, 624.2, 137/624.13, 624.15, 88, 111, 238, 240; 422/261

[56] References Cited
U.S. PATENT DOCUMENTS 2,683,622 7/1954 Dragon .
2,920,635 1/1960 Wilson .
3,607,105 9/1971 Reid et al. .
3,901,724 8/1975 White .................... 137/268
4,085,043 4/1978 Ellis .
4,188,970 2/1980 Maidment ................. 137/268

*Primary Examiner*—Alan Cohan
*Attorney, Agent, or Firm*—Allen H. Erickson; Thomas L. Johnson; B. Woodrow Wyatt

[57] ABSTRACT

An apparatus for introducing powdered solids into a liquid stream at a controlled rate to form a slurry. Solids are metered to an eductor where they are educted into the liquid stream. An automatic cycle timer-controller purges eductor, hopper and piping of residual solids before solids flow is initiated, and following solids flow. Pressure sensors detect low water pressure and/or plugging, shutting off liquid and solids flow.

18 Claims, 2 Drawing Figures

APPARATUS FOR SLURRYING POWDERED SOLIDS

BACKGROUND OF THE INVENTION

1. Field of the Invention

This invention relates to an apparatus for entraining and mixing powdered solids into a liquid stream with an eductor, and a control system therefor.

2. Description of the Prior Art

Devices known as aspirators, eductors or ejectors are commonly used to provide inline mixing of two flowing streams. A pressurized primary motive fluid is passed through a nozzle at high velocity. Its momentum and kinetic energy are used to entrain, mix and compress a second fluid stream. The primary pressurized fluid and secondary (entrained) fluid are typically both liquid or both gaseous. In the latter case, the device is known as a pneumatic mixing tube or pneumatic conveyor.

One such system using liquid streams is shown in Dragon U.S. Pat. No. 2,683,622, where a fertilizer solution is mixed with diluting water in a "Venturi section" comprising an eductor.

In another system disclosed by Reid et al U.S. Pat. No. 3,607,105, dry chemical powders are mixed and dissolved with water to make lump-free solutions, using an aspirator.

In Ellis U.S. Pat. No. 4,085,043, an aqueous suspension of granular carbon is moved from vessel to vessel in a carbon contact system, using pressurized water passing through eductors.

Special problems often occur when one of the streams contains solids particles. For example, in Wilson U.S. Pat. No. 2,920,635, a method for intermittently transferring a slurry from a vessel into an aspirating stream of water is shown. Plugging of the transfer line between the slurry vessel and a flow control valve is a problem which his invention addresses by applying a continuously flowing backwash stream.

Transfer of a dry powder such as powdered activated carbon (PAC) into a liquid stream such as water introduces further problems. When wetted in the range of about 40 to 90 percent water, PAC assumes the consistency of a sticky paste which clings to the surfaces of the hopper. Therefore it is important to (a) remove all solids from the hopper and conduit at the end of each flow cycle and (b) ensure that the hopper and conduit are essentially free of liquid before initiating the flow of powdered solids.

Periods of low process-water pressure are a common occurence in many industrial plants and wastewater treatment installations. Where such water is used as the primary fluid in an eductor system, the energy entraining the solids may be insufficient to handle all of the powdered solids entering the eductor and the system may become clogged, particularly where the solids enter the eductor. The water pressure may drop to a level where suction is lost and water floods the pipe carrying the powdered solids. Plugging of the slurry pipeline downstream from the eductor will have the same result, that is, a paste of powdered solids and water at the entrance to the eductor will prevent movement of dry powdered solids into the eductor.

SUMMARY OF THE INVENTION

This invention is an apparatus for introducing powdered solids such as powdered activated carbon into a liquid stream at a uniform and controlled rate to form a slurry for use in a further process.

Plugging of equipment with powdered solids pastes and water backup into the solids storage vessel are alleviated or avoided by this apparatus, which comprises;

a vessel for storing powdered solids and from which solids flow is assisted by gravity;

metering means communicating with said storage vessel and controlling the flow rate of said solids from said vessel;

an eductor through which said liquid stream passes, having a pressure liquid inlet, suction inlet for introduction of said solids into the liquid, and outlet for discharging the slurry formed thereby;

a conduit for transporting said solids from said metering means to said eductor;

a first power actuated valve in said conduit;

a pressure liquid line connected to pressure liquid inlet of eductor;

a second power actuated valve in said pressure liquid line;

a first pressure sensor in said pressure liquid line;

a slurry discharge line from eductor outlet to a slurry using process;

a second pressure sensor in said slurry discharge line;

automatic cycle timer-controller means sequentially opening said second power actuated valve for a first predetermined time period, subsequently opening said first power actuated valve and activating said metering means, maintaining both said power actuated valves open and said metering means activated for a first controlled time period, subsequently closing first power actuated valve and deactivating said metering means for a second predetermined time period, subsequently closing said second power actuated valve, maintaining both power actuated valves closed and metering means deactivated for a second controlled time period, and thereafter, repeating automatic timer-controller sequence; and automatic means for closing both power actuated valves and deactivating said metering means when said first pressure sensor measures pressure lower than a first preset value or when said second pressure sensor measures pressure than a second preset value or when the measured pressure difference between the first and second pressure sensor is less than a third preset value.

DESCRIPTION OF THE PREFERRED EMBODIMENT

Figure 1:
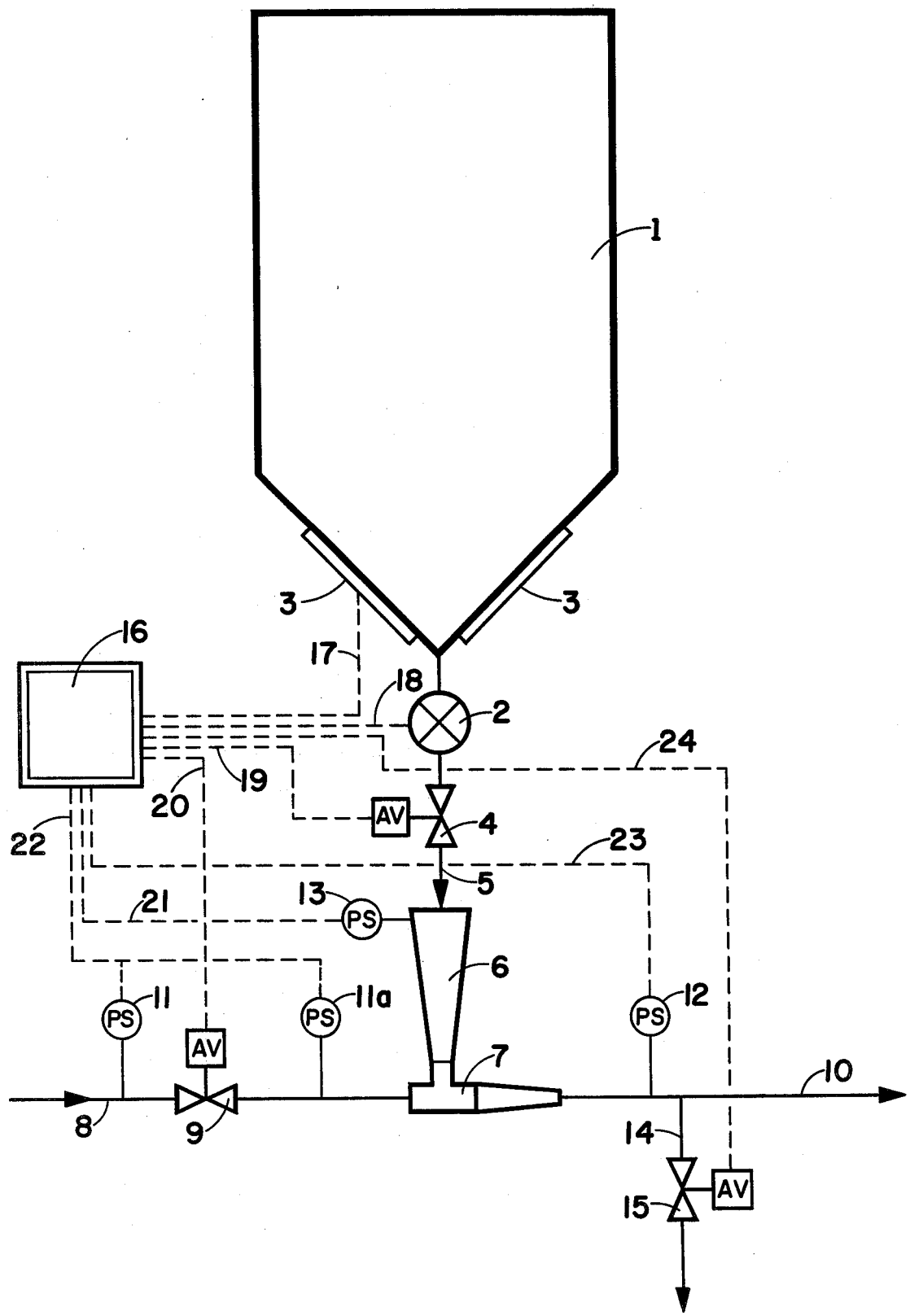
FIG. 1 is a schematic diagram of the invention.

A system for slurrying powdered solids in a liquid stream according to this invention is shown in FIG. 1.

A storage vessel 1 supplies powdered solids by gravity to metering device 2, typically a rotary valve having a variable speed drive. Often, though not always, vibratory or aerator bin activators or similar devices 3,3 are necessary to produce a continuous uniform flow of solids from the storage vessel.

A power actuated valve 4 in conduit 5 controls the flow of solids from metering device 2 to eductor 7. Valve 4 provides ON-OFF control of solids flow and is actuated by a pneumatic, electrical or other motive system. Typically, a butterfly or iris valve is used; these valves have little restriction to flow when fully open.

Conduit 5 allows the powdered solids to flow by a combination of gravity and vacuum forces into eductor 7. In the preferred embodiment, the portion of conduit 5 adjacent to eductor 7 is enlarged to form cone shaped hopper 6, which simultaneously provides additional in-line solids storage capacity and a smooth flow of solids into the eductor. The side walls of hopper 6 exceed the angle of repose assumed by the powdered solids, thus enabling uniform, continuous flow of powdered solids into eductor 7.

Optionally, one or more orifices on the upper end surface or in the upper portion of the hopper side wall allow air to pass into the hopper and fluidize the solids as they are drawn downward into eductor 7. The orifices are sized by standard design procedures to supply sufficient fluidizing air without unduly diminishing the vacuum level in the hopper. Generally, it is desirable to maintain 0.5 to 5 or more inches of water as a hopper vacuum level.

The pressure liquid into which the powdered solids are to be entrained and mixed is supplied to the eductor through line 8; its flow is controlled by a power actuated ON-OFF valve 9, typically an electrical solenoid or pneumatically operated valve. In most instances the pressure liquid is water, usually available at 50–120 psig pressure.

In the eductor, the pressure liquid is first accelerated by passage through a constrictive nozzle. It is then expanded into a mixing section before passing into a region where velocity is further reduced and some of the pressure loss is recovered. Powdered solids are drawn into the pressure liquid in the mixing section where a partial vacuum is created by the momentum and kinetic energy of the pressure liquid. A minimum liquid flow rate dependent upon eductor design, is necessary to entrain solids. The solids capacity of the eductor increases rapidly as the liquid flow rate is increased above the minimal level.

The mixture of air, slurried solids and liquid pass from the eductor to a using process via slurry line 10.

A timer-controller system 16 receives signals through line 22 from pressure sensor 11 or 11a, through line 23 from pressure sensor 12 and optionally, through line 21 from pressure sensor 13 which is typically a vacuum sensor.

Insufficient pressure in pressure liquid line 8, and excessive pressure in slurry line 10 or optionally in hopper 6, due to plugging of line 10 thus act to automatically close valves 4 and 9 and turn off metering device 2.

Optionally, drain valve 15 is installed in drain line 14 to divert pressure fluid from the solids-using process during startup and shutdown of the addition system, at times when slurry line 10 is plugged or when insufficient vacuum is created by eductor 7.

This invention operates to initially flush eductor 7 with liquid, typically water, drawing residual solids present in hopper 6 and/or conduit 5 into the water stream. This stream may be directed to a slurry using process through line 10, to a drain through line 14 and valve 15, or elsewhere.

Following this timed initial flush period, typically pre-set to last 5 to 120 seconds and usually less than 30 seconds, the flow of powdered solids is started and maintained for a pre-determined period. This second period may be of any duration, depending on the requirements of the slurry using process, but typically is pre-set at 1–600 minutes. Alternately, the duration of solids flow may be automatically controlled by the needs of the slurry-using process.

In another embodiment, metering device 2 is continuously and automatically controlled to provide the indicated rate of solids flow. A rotary valve with speed control is an example of such a device.

At the end of the solids flow period, metering device 2 is shut off and valve 4 is closed; water flow is continued for a pre-set period, typically 1–15 minutes, in order to empty hopper 6 and conduit 5 of solids and flush solids from slurry line 10.

Following this final flush period, water flow is shut off and the timer-controller is in condition to repeat the total cycle, either automatically or if desired, by manual initiation.

Alarm conditions are detected by pressure sensors 11, 12 and/or optionally 13, which act to shut off both water flow and flow of powdered solids by closing valves 4 and 9 and shutting off metering device 2. In another embodiment, drain line valve 15 is opened to allow discharge of slurry and water when flow through line 10 is hampered by plugging, etc.

Automatic timer-controller means 16 is an electrical network which performs the controlling function in response to initial activation by automatic or manual means.

Figure 2:
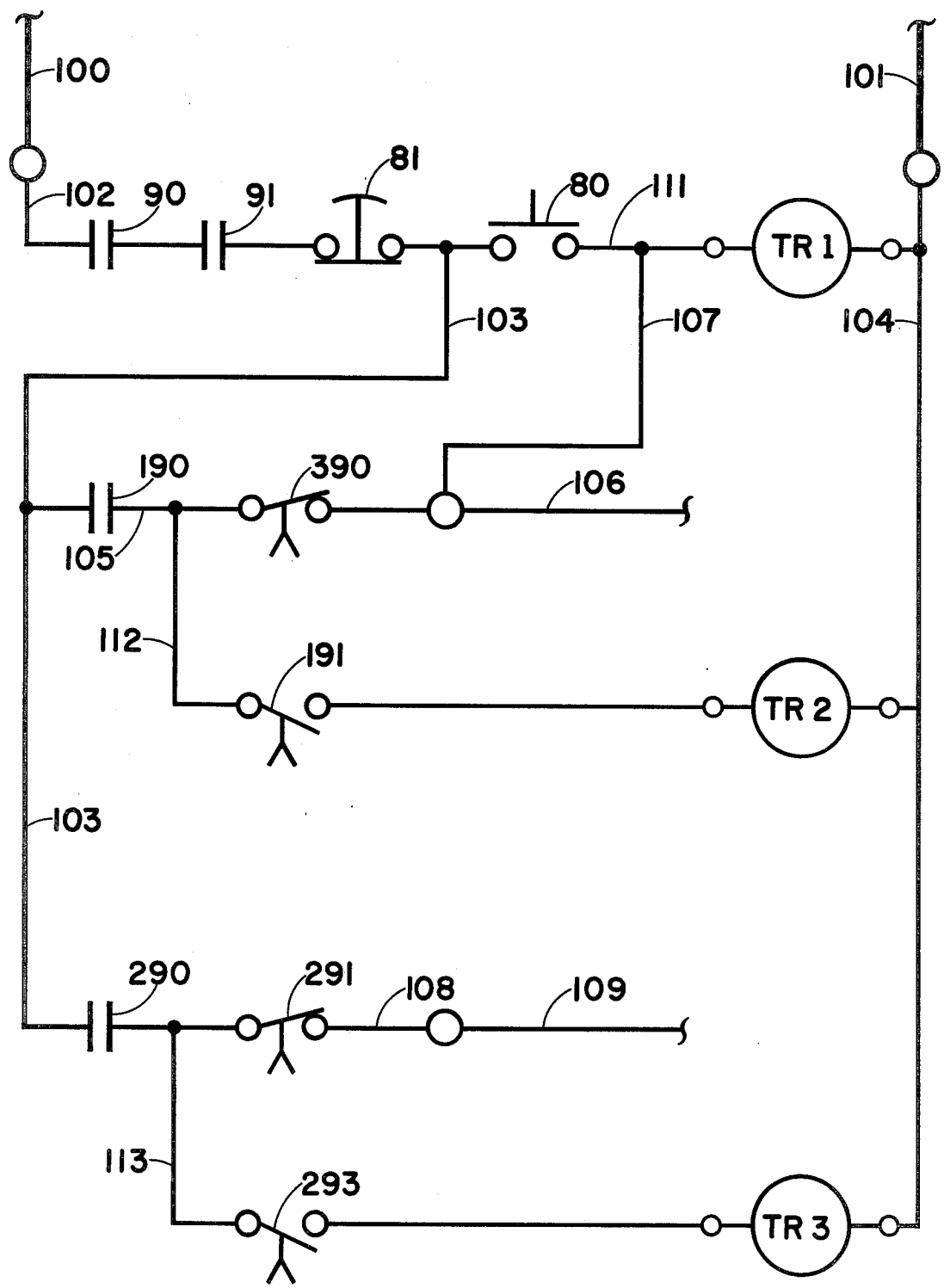
FIG. 2 is a more detailed electrical schematic of the timer-controller network.

FIG. 2 illustrates one embodiment of timer-controller means 16 of this invention. Other embodiments will become evident during the discussion which follows. Electrical conduits from timer relays to respective relay contact switches are not shown but are delineated in this discussion.

Referring now to the embodiment in FIG. 2, the timer-controller means includes three timer relays designated TR1, TR2 and TR3 located in parallel branches 111, 112 and 113, respectively, across conductors 103 and 104. Electrical current is carried from a power source at uniform voltage through main conductors 100 and 101 to conductors 103 and 104, respectively.

Instantaneous relay contact 190 and delayed relay contact 191, both normally opened, are activated by timer relay TR1; instantaneous relay contact 290, normally open, and delayed relay contacts 291, normally closed, and 293, normally open, are activated by timer relay TR2; and delayed relay contact 390, normally closed, is activated by timer relay TR3.

Closing of START switch 80 energizes timer relay TR1 which instantaneously closes relay contact 190 allowing continuous power to TR1, and energizes power actuated valve 9 to allow pressure liquid, typically water at 50–120 psi, to enter eductor 7. At the end of this first timed period TR1 closes relay contact 191, starting timer relay TR2. Relay contact 190 remains closed.

When timer relay TR2 is energized, it immediately closes relay contact 290, thus energizing line 109 to open valve 4, start metering device 2, and start bin activators 3,3 if such are used. Other equipment which one may wish to operate simultaneous to slurrying of the powdered solids may also be activated by closing of relay contact 290.

At the end of the timed solids addition period, timer relay TR2 opens relay contact 291, closing valve 4 and shutting off metering device 2, bin activators 3,3 and any other equipment energized through line 109. Timer relay TR2 also closes relay contact 293 to start timer relay TR3, which, after a pre-set period in which pressure liquid flushes solids from eductor 7, hopper 6 and slurry line 10, opens relay contact 390 to close valve 9. Relay contacts 190, 191, 290, 291, 293, and 390 return to their normal position.

Emergency switch 81, located on conductor 102 provides for manual shutoff.

Relay contacts 90 and 91 are activated according to signals from pressure sensors 11 and 12 such that if the pressure in line 8 is too low to provide sufficient solids slurrying capacity, or if the pressure in line 10 is too high, indicating plugging or other problems, solids addition and water flow will not be initiated, or if already operating, will stop.

If pressure sensor 11a is used, a time delay activated by the start of TR1 is necessary to open valve 9 and allow pressure sensor 11a to detect full line pressure.

The pressure settings which are used to activate and open relay contacts 90 and 91 are based on the slurrying capacity of the particular eductor, expressed for example as pounds solids per hour at various pressure drop across the eductor, and will also depend on the normal pressure of the pressure liquid and expected pressure drop through slurry line 10.

In an alternate embodiment, the pressure difference between line 8 and in line 10 opens relay contact 90 when it is below a pre-set value.

In a further embodiment, pressure sensor 13, usually a vacuum sensor, opens relay contact 90 when a minimum pre-set vacuum level is not maintained in hopper 6. In this embodiment, a time delay function is incorporated into the timer-controller in order to initiate water flow to form a vacuum.

Pressure sensors 11, 11a and 12 may be pressure switches. Pressure sensor 13 may be a vacuum switch.

In a yet further embodiment, not shown in FIG. 1, a level sensor in hopper 6 opens relay contact 91 when a liquid level is detected. This level sensor may be a level switch.

Where the requirement for slurried solids does not significantly change from day to day, the rate of metering means 2 and the timed periods of timer relays TR1, TR2 and TR3 may be preset. Where requirements change significantly with time, the net rate of slurried solids may be continuously or semi-continuously controlled.

In one embodiment, the timed period of solids addition in TR2 is varied automatically during each cycle in response to solids requirement.

In another embodiment, the OFF period between cycles is varied automatically in response to solids requirements.

The apparatus of this invention has been found to be particularly applicable to the slurrying of powdered carbon in water.

I claim:

1. An apparatus for introducing powdered solids into a liquid stream at a controlled rate to form a slurry, comprising:
   a vessel for storing powdered solids and from which solids flow is assisted by gravity;
   metering means communicating with said storage vessel and controlling the flow rate of said solids from said vessel;
   an eductor through which said liquid stream passes, having a pressure liquid inlet, suction inlet for introduction of said solids into the liquid, and outlet for discharging the slurry formed thereby;
   a conduit for transporting said solids from said metering means to said eductor;
   a first power actuated valve in said conduit;
   a pressure liquid line connected to pressure liquid inlet of eductor;
   a second power actuated valve in said pressure liquid line;
   a first pressure sensor in said pressure liquid line;
   a slurry discharge line from eductor outlet to a slurry using process;
   a second pressure sensor in said slurry discharge line;
   automatic cycle timer-controller means sequentially opening said second power actuated valve for a first predetermined time period, subsequently opening said first power actuated valve and activating said metering means, maintaining both said power actuated valves open and said metering means activated for a first controlled time period, subsequently closing first power actuated valve and deactivating said metering means for a second predetermined time period, subsequently closing said second power actuated valve, maintaining both power actuated valves closed and metering means deactivated for a second controlled time period, and thereafter, repeating automatic timer-controller sequence; and
   automatic means for closing both power actuated valves and deactivating said metering means when said first pressure sensor measures pressure lower than a first preset value or when said second pressure sensor measures pressure higher than a second preset valve or when the measured pressure difference between the first and second pressure sensors is less than a third preset value.

2. An apparatus according to claim 1, wherein said first pressure sensor is upstream of said second power actuated valve in pressure liquid line.

3. An apparatus according to claim 1, wherein said first pressure sensor is downstream of said second power actuated valve in pressure liquid line, and said sensor is activated, with time delay, when said second power actuated valve is opened.

4. An apparatus according to claim 1, wherein said first controlled time period is preset.

5. An apparatus according to claim 1, wherein said first controlled time period is determined by said automatic cycle timer-controller according to measured requirement of said slurry using process.

6. An apparatus according to claim 1, wherein said second controlled timer period is preset.

7. An apparatus according to claim 1, wherein said second controlled time period is determined by said automatic cycle timer-controller according to measured requirement of said slurry using process.

8. An apparatus according to claim 1, wherein solids metering rate of said metering means is controlled continuously or semi-continuously according to measured requirement of said slurry using process.

9. An apparatus according to claim 1, in which the metering means comprises a rotary valve for feeding and metering said powdered solids.

10. An apparatus according to claim 1, wherein said pressure sensors are pressure switches.

11. An apparatus according to claim 1, wherein the powdered solids are powdered activated carbon.

12. An apparatus according to claim 1, wherein said conduit between said metering means and said eductor is enlarged in cross-section to be a cone shaped hopper for solids passing to said eductor.

13. An apparatus according to claim 12, wherein said hopper has one or more orifices in its upper section allowing passage of air into said hopper at a rate which fluidizes said solids at said suction inlet while maintaining a partial vacuum within said hopper.

14. An apparatus according to claim 12, further comprising a vacuum sensor which measures the vacuum level in said hopper; and automatic timer-controller means closing first power actuated valve and deactivating said metering means when vacuum sensor measures a vacuum level less than a fourth preset value.

15. An apparatus according to claim 14, wherein said vacuum sensor is a vacuum switch.

16. An apparatus according to claim 12, further comprising a sensor measuring the liquid level in said hopper; and automatic timer-controller means closing first power-actuated valve and deactivating said metering means when said liquid level sensor measures a level higher than a fifth preset value.

17. An apparatus according to claim 16, wherein said liquid level sensor is a switch controlled by the liquid level.

18. An apparatus according to claim 1, further comprising:

a drain pipe communicating with discharge slurry line, and having a third power actuated valve therein; and automatic timer-controller means opening said third power actuated valve when the measured pressure difference between the first and second pressure sensors is lower than a sixth preset value or when second pressure sensor measures a pressure exceeding a seventh preset value.

* * * * *

UNITED STATES PATENT AND TRADEMARK OFFICE
CERTIFICATE OF CORRECTION

PATENT NO. : 4,357,953

DATED : November 9, 1982

INVENTOR(S) : Donald E. Patterson

It is certified that error appears in the above—identified patent and that said Letters Patent is hereby corrected as shown below:

Column 1, line 52, "occurence" should read -- occurrence --.

Column 2, line 44, insert -- higher -- after "pressure".

Signed and Sealed this

First Day of February 1983

[SEAL]

Attest:

GERALD J. MOSSINGHOFF

Attesting Officer

Commissioner of Patents and Trademarks